(12) United States Patent
Krupnova et al.

(10) Patent No.: US 9,589,084 B2
(45) Date of Patent: Mar. 7, 2017

(54) METHOD AND SYSTEM FOR REPRODUCING PROTOTYPING FAILURES IN EMULATION

(71) Applicant: Synopsys, Inc., Mountain View, CA (US)

(72) Inventors: Helena Krupnova, Palaiseau (FR); Yogesh Goel, Fremont, CA (US)

(73) Assignee: Synopsys, Inc., Mountain View, CA (US)

(*) Notice: Subject to any disclaimer, the term of this patent is extended or adjusted under 35 U.S.C. 154(b) by 99 days.

(21) Appl. No.: 14/448,708

(22) Filed: Jul. 31, 2014

(65) Prior Publication Data

US 2015/0040086 A1 Feb. 5, 2015

Related U.S. Application Data

(60) Provisional application No. 61/860,888, filed on Jul. 31, 2013.

(51) Int. Cl.
*G06F 17/50* (2006.01)
*G06F 11/00* (2006.01)
*G06F 11/16* (2006.01)

(52) U.S. Cl.
CPC ...... *G06F 17/5027* (2013.01); *G06F 17/5036* (2013.01); *G06F 11/16* (2013.01); *G06F 17/5022* (2013.01); *G06F 17/5054* (2013.01); *G06F 2217/06* (2013.01); *G06F 2217/64* (2013.01); *G06F 2217/86* (2013.01)

(58) Field of Classification Search
None
See application file for complete search history.

(56) References Cited

U.S. PATENT DOCUMENTS

| | | | | |
|---|---|---|---|---|
| 5,425,036 A * | 6/1995 | Liu | ...................... | G06F 17/5027 714/725 |
| 6,920,416 B1 * | 7/2005 | Swoboda | .............. | G06F 11/261 703/13 |
| 7,827,510 B1 * | 11/2010 | Schubert | ............. | G06F 17/5027 716/111 |
| 2010/0100860 A1 * | 4/2010 | Chang | ................. | G06F 17/5027 716/111 |
| 2010/0305933 A1 * | 12/2010 | Chang | ................. | G06F 17/5027 703/15 |
| 2011/0202894 A1 * | 8/2011 | Chang | ................. | G06F 17/5027 716/108 |

* cited by examiner

*Primary Examiner* — Leigh Garbowski
(74) *Attorney, Agent, or Firm* — Alston & Bird LLP (57) ABSTRACT

A method for simulating a circuit includes running a first prototype of the circuit a predetermined number of cycles behind a second prototype of the circuit, and running a hardware emulator of the circuit in accordance with an input trace received by the first prototype and the second prototype.

9 Claims, 5 Drawing Sheets

METHOD AND SYSTEM FOR REPRODUCING PROTOTYPING FAILURES IN EMULATION

CROSS-REFERENCES TO RELATED APPLICATIONS

This application claims priority, under 35 U.S.C. §119(e), from U.S. Provisional Application No. 61/860,888, filed on Jul. 31, 2013, entitled "A METHOD AND SYSTEM FOR REPRODUCING PROTOTYPING FAILURES IN EMULATION", the contents of all of which is incorporated herein by reference in its entirety.

BACKGROUND

The present invention relates generally to a method and system for computer aided design (CAD) of integrated circuits and in particular to reproducing prototyping failures in emulation.

Application specific integrated circuits (ASIC) and system on chip (SoC) integrated circuits (ICs) have become more complex and difficult to validate or test by software simulation alone. Hardware assisted circuit design verification overcomes some of these software simulation difficulties. Two types of hardware assisted circuit design verification include prototyping and emulation. Designers build boards called prototypes including field programmable gate array (FPGA) ICs. The circuit design represented as hardware description language (HDL) is compiled and programmed into the FPGAs, which provide a hardware implementation of the circuit for testing. Prototypes provide the best runtime performance, i.e. high speed, among all the available present verification technologies. Higher speed allows designers to validate very complex chip designs. The input to a prototype may be connected to real time signal sources such as a universal serial bus (USB), Ethernet, or the like, to verify the circuit's functions. Prototyping however has two major limitations; long time to bring up, i.e. long time to have a working model, and limited runtime debugging.

Emulation is faster to bring up, provides greater debugging capability, but has slower performance than prototyping. Unlike prototypes, emulators include elaborate runtime/firmware support, which sacrifices performance for debugging, and have fixed interconnects between processing elements. The debug support requires a software stack that is capable of mapping user signals to their location in the physical device, which models the user design.

Accordingly, there is a need for a hardware assisted circuit design verification method and system having the advantages of high speed prototyping, while preserving the faster time to bring up and better debugging capability of emulation.

SUMMARY

According to one embodiment of the present invention, a method for simulating a circuit includes running a first prototype of the circuit a predetermined number of cycles behind a second prototype of the circuit. The method further includes running a hardware emulator of the circuit in accordance with an input trace received by the first prototype and the second prototype.

According to one embodiment, the method further includes compiling a representation of the circuit to form the first prototype, the second prototype, and the hardware emulator when a compiler is invoked to compile the circuit. According to one embodiment, compiling includes programming a multitude of logic structures in a field programmable gate array (FPGA) chip. According to one embodiment, compiling further includes compiling a register transfer logic (RTL) inference representing the circuit into a multitude of design objects thereby forming a location database associated with the multitude of design objects. The design objects are implemented respectively in the first prototype, the second prototype, and the hardware emulator.

According to one embodiment, the location database maps the location of each of the multitude of design objects respectively in the first prototype, the second prototype, and the hardware emulator. According to one embodiment, running the hardware emulator further includes receiving at the hardware emulator, in accordance with the location database, a multitude of values associated with a state of the first prototype when a condition in the second prototype is met. According to one embodiment, receiving includes capturing each of the multitude of values in an associated different one of a multitude of registers in the first prototype. Receiving further includes loading each of the multitude of values in an associated different one of a multitude of registers in the hardware emulator.

According to one embodiment, running the first prototype further includes capturing an input of the first prototype and the second prototype, thereby forming the input trace. According to one embodiment, the predetermined number of cycles recreate a condition leading to a verification error of the circuit when the circuit includes the verification error.

According to one embodiment, running the first prototype further includes freezing a state of the first prototype when a condition in the second prototype is met. According to one embodiment, running the first prototype further includes arming the condition in the second prototype. According to one embodiment, running the first prototype further includes freezing a state of the second prototype.

According to one embodiment, the input trace includes a multitude of input signals captured during the predetermined number of cycles. According to one embodiment, the first prototype and the second prototype are substantially identical to one another.

According to one embodiment of the present invention, a circuit verification hardware includes a first prototype of the circuit configured to run a predetermined number of cycles behind a second prototype of the circuit. The circuit verification hardware further includes a hardware emulator of the circuit configured to run in accordance with an input trace received by the first prototype and the second prototype.

According to one embodiment, the circuit verification hardware further includes a compiler configured to compile a representation of the circuit into the first prototype, the second prototype, and the hardware emulator when the compiler is invoked to compile the circuit. According to one embodiment, the compiler is further configured to program a multitude of logic structures in a field programmable gate array (FPGA) chip. According to one embodiment, the compiler is further configured to compile a register transfer logic (RTL) inference representing the circuit into a multitude of design objects thereby forming a location database associated with the multitude of design objects. The design objects are implemented respectively in the first prototype, the second prototype, and the hardware emulator.

According to one embodiment, the location database is configured to map the location of each of the multitude of design objects respectively in the first prototype, the second prototype, and the hardware emulator. According to one embodiment, the hardware emulator is further configured to receive, in accordance with the location database, a multitude of values associated with a state of the first prototype when a condition in the second prototype is met. According to one embodiment, the first prototype is further configured to capture each of the multitude of values in an associated different one of a multitude of registers in the first prototype. The hardware emulator is further configured to load each of the multitude of values in an associated different one of a multitude of registers in the hardware emulator.

According to one embodiment, the circuit verification hardware further includes a buffer coupled between the first prototype and an input of the second prototype. The buffer is configured to capture the input of the second prototype, thereby forming the input trace.

According to one embodiment, the first prototype is further configured to freeze a state of the first prototype when a condition in the second prototype is met. According to one embodiment, the second prototype is configured to arm the condition. According to one embodiment, the second prototype is configured to freeze a state of the second prototype.

According to one embodiment of the present invention, a system for simulating a circuit is configured to run a first prototype of the circuit a predetermined number of cycles behind a second prototype of the circuit. The system for simulating a circuit is further configured to run a hardware emulator of the circuit in accordance with an input trace received by the first prototype and the second prototype.

According to one embodiment, the system is further configured to compile a representation of the circuit into the first prototype, the second prototype, and the hardware emulator when a compiler is invoked to compile the circuit. According to one embodiment, the system further includes a buffer coupled between the first prototype and an input of the second prototype. The buffer is configured to capture the input of the second prototype, thereby forming the input trace.

A better understanding of the nature and advantages of the embodiments of the present invention may be gained with reference to the following detailed description and the accompanying drawings.

DETAILED DESCRIPTION

Figure 1:
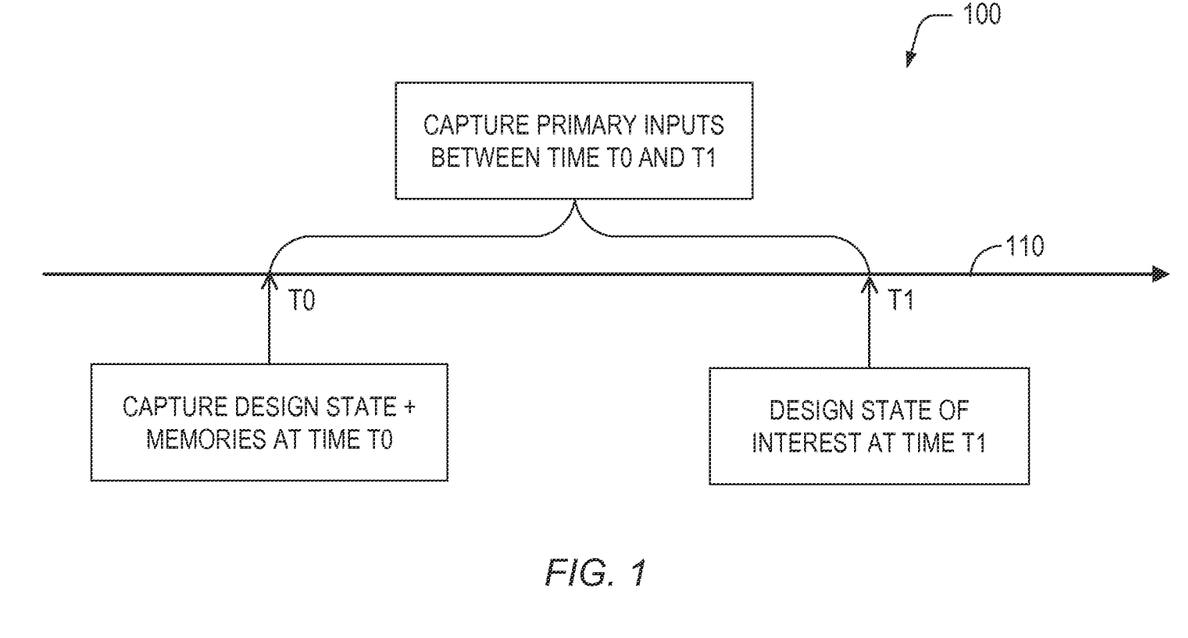
FIG. 1 depicts a simplified design-state capture timeline, in accordance with one embodiment of the present invention.

FIG. 1 depicts a simplified design-state capture timeline 100, in accordance with one embodiment of the present invention. A time axis 110 is depicted as a horizontal arrow pointing to increasing time to the right and includes times T0 and T1 where T1 occurs after T0. Because a prototype does not have adequate capabilities to easily debug a circuit design state when an error or incident of interest is detected at time T1, the design state of the prototype at time T0 plus all the primary inputs to the prototype between time T0 and T1 are captured.

The captured design state of the prototype may then be loaded into an emulator, which may be run using the captured inputs between time T0 and T1. Thus, the hardware assisted circuit design verification may be transferred from the prototype to the emulator for debugging the error, while the rest of the verification before T0 runs in the more efficient prototype environment. In other words, the prototype runtime environment may be replayed in the emulator duplicating the conditions leading to the circuit verification error. Because the prototype runs faster than the emulator and because the emulator has greater debug capability than the prototype leading to easier/quicker analysis of the error, the overall time to bring up and run the hardware assisted circuit design verification is significantly reduced compared to running only in the prototype environment.

Figure 2A:
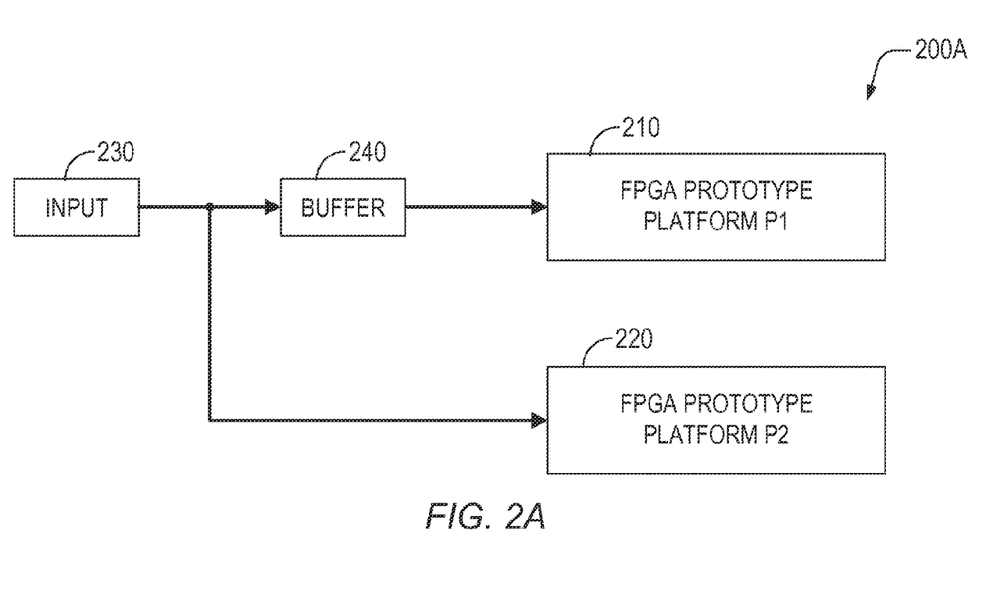
FIG. 2A depicts a simplified design state capture system to capture the design state depicted in FIG. 1, in accordance with one embodiment of the present invention.

FIG. 2A depicts a simplified design state capture system 200 to capture the design state depicted in FIG. 1, in accordance with one embodiment of the present invention. Design state capture system 200A includes two prototype platforms P1, P2 respectively 210, 220, input 230, and buffer 240. Input 230 is directly coupled to buffer 240 and prototype platform P2. Input 230 may include a multitude of signals such as external real time peripheral interfaces such as USB, Ethernet, and the like, and feed into the circuit design being verified. Buffer 240 is coupled between input 230 and prototype platform P1. Buffer 240 may be configured to capture all primary input signals between times T0 and T1, called an input trace, via high speed memory. The input trace may include a multitude of signals, which may span for example, millions of cycles between times T0 and T1. The same input appears at prototype platforms P1, P2, except the input to prototype platform P1 is delayed behind the input to prototype platforms P2. Thus, prototype platform P1 is configured to run (T1−T0) cycles behind prototype platform P2. The number of (T1−T0) cycles and the depth of the memory in buffer 240 is predetermined, i.e. adjusted by the designer to properly recreate conditions leading to the verification error of interest.

Each of prototype platforms 210, 220 may be significantly similar or physically substantially identical such that the hardware verification in prototype platform 210 will run in the same way as the hardware verification in prototype platform 220 except being shifted by (T1−T0) cycles back in time for prototype platform 210. Prototype platform 220 is configured with an error condition arming function described below, which makes prototype platform 220 configured slightly differently than prototype platform 210 without significantly changing the way the rest of the hardware verification runs for the circuit being verified in the prototype platforms 210, 220. Further, each of prototype platforms 210, 220 may include FPGA ICs including logic structures that may be programmed such that both prototype platforms P1, P2 are each loaded with the same circuit design being verified and are connected to significantly similar environments.

An example of a prototype platform is the Proxima by Synopsys, Inc., which includes an embedded trace buffer to capture signal values at speed for millions of clock cycles. The FPGAs in the prototype platforms provide shadow registers for all state elements, i.e. design objects, such that the values of all state elements including design memories at times T0, T1 may be respectively frozen and captured from prototype platform P1, P2 when a scenario of interest is detected by prototype platform P2 at T1. The scenario of interest is detected by arming a trigger condition in prototype platform P2 that identifies when the desired condition of interest or error state is met. The values associated with the state may be read out of the prototype platforms using a "readback" feature of the FPGA devices. Once put into the frozen state, the values of the signals and the design memories in the prototype platforms may be extracted using the location database created at the compile time for forming the prototype platforms to be described below.

Figure 2B:
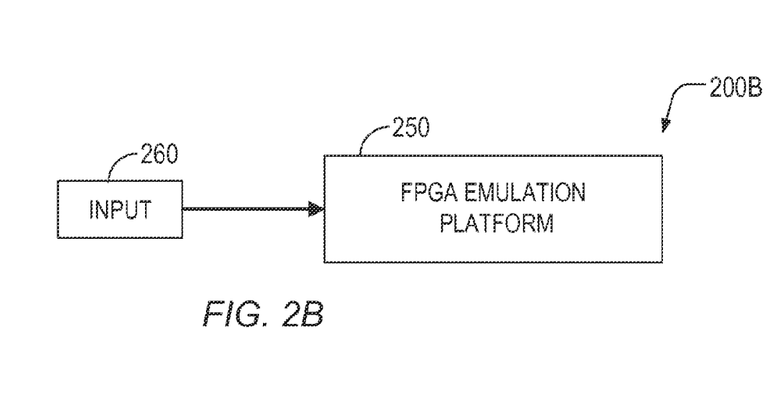
FIG. 2B depicts a simplified emulation system to run the captured design state depicted in FIG. 1, in accordance with one embodiment of the present invention.

FIG. 2B depicts a simplified emulation system 200B to run the captured design state depicted in FIG. 1, in accordance with one embodiment of the present invention. Emulation system 200B includes emulation platform 250 coupled to input 260. An example of emulation platform 250 is the ZeBu-Server by Synopsys, Inc., which may include FPGA devices, a software stack configured to aid debugging, and a "writeback" feature configured to restore design states and memories. Input 260 may be the same as or different than input 230 depicted in FIG. 2A, however, input 260 is configured to replay the input trace captured by buffer 240.

Figure 3:
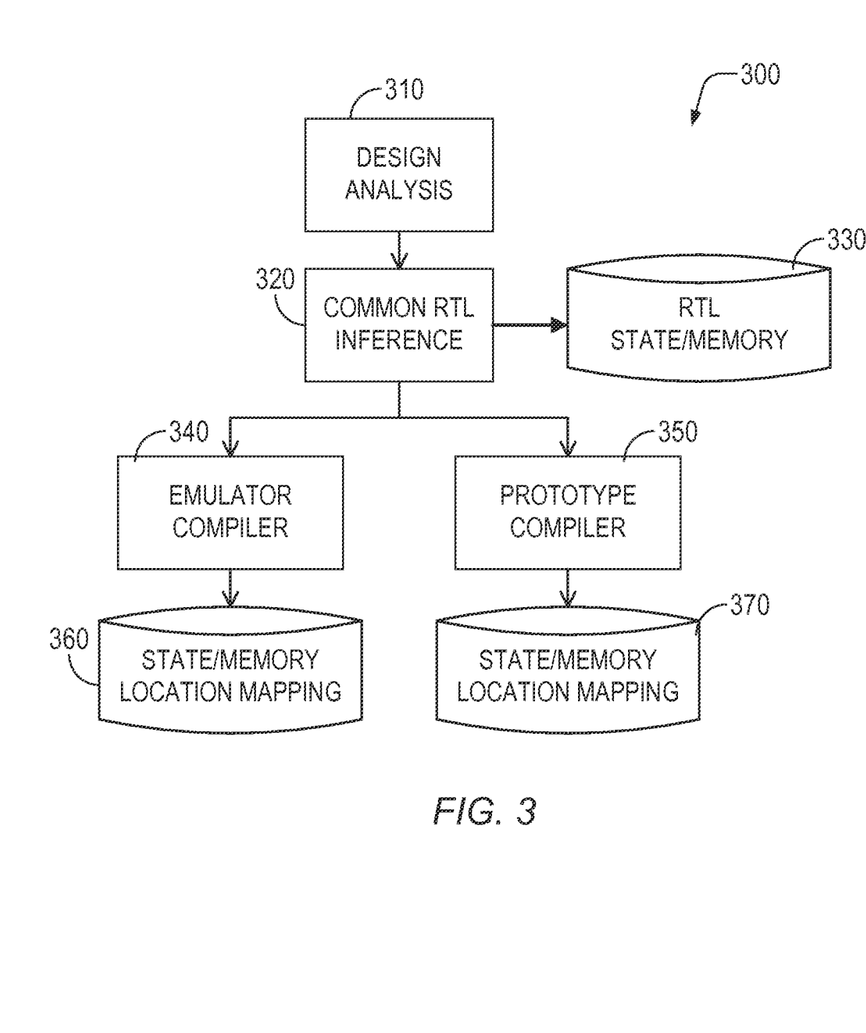
FIG. 3 depicts a simplified compiler system, in accordance with one embodiment of the present invention.

FIG. 3 depicts a simplified compiler system 300, in accordance with one embodiment of the present invention. Compiler system 300 includes design analysis 310 which provides a common register transfer logic (RTL) inference 320 representing the circuit being verified, which is stored in database RTL state/memory 330.

The Hardware designers express the intent of their designs in hardware description language (HDL)—System Verilog and VHDL are two such industry standard languages. The software systems for both emulator and prototype system analyzes and compiles the HDL description into the target hardware (HW) architecture. In order to replay the design states and design memory values from prototype platform P1 into an emulator, there will be a common understanding of the set of design states and the set of design memories that are getting mapped to the prototype and emulation systems. Thus, common RTL inference 320 ensures that the RTL design objects that are mapped as memories and design states are common to both prototype platforms P1, P2 and emulation platform 250. The separate emulator and prototype back-end compilers 340, 350 respectively, annotate the physical location information for these design state and design memories into another database called the state/memory location mapping database 360, 370, respectively, which may be a combined database, hereinafter also referred to as the "location database". The location database ensures that once the values of the design state and memories are available, the values can be moved to the right location in the correct platform.

For example, when a register called A is specified in the design by common RTL inference 320, then the location database knows where register A is located in either the prototype platform or in the emulator. Thus, values corresponding to the state of register A may be read out or loaded to the proper associated logic structures either in the prototype platform or in the emulator.

Figure 4:
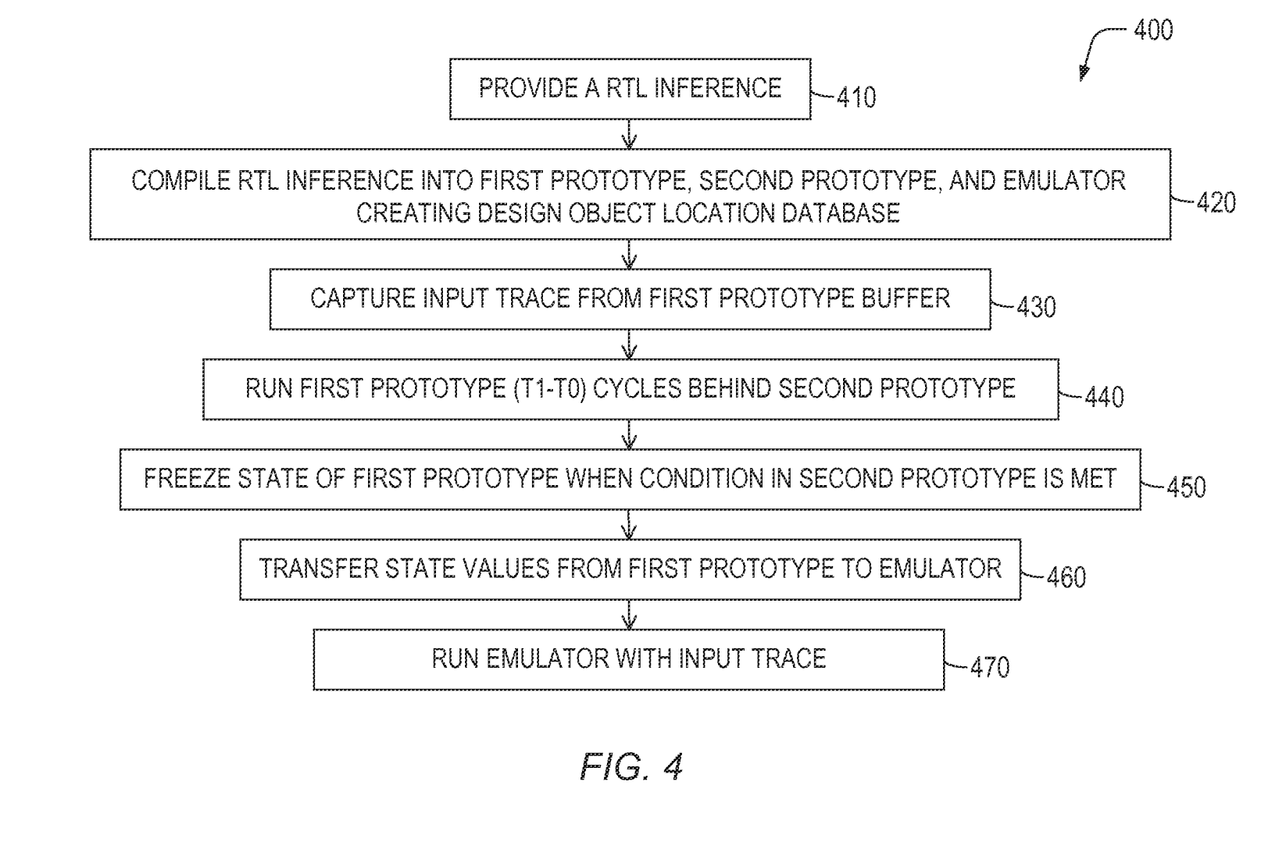
FIG. 4 depicts a simplified method for simulating a circuit by reproducing a prototyping failure in emulation, in accordance with one embodiment of the present invention.

FIG. 4 depicts a simplified method 400 for simulating a circuit by reproducing a prototyping failure in emulation, in accordance with one embodiment of the present invention. Referring simultaneously to FIGS. 1-4, the common RTL inference 320 representing the circuit to be verified is provided 410. Common RTL inference 320 is compiled 420 by compilers 340, 350 into a multitude of design objects implemented respectively in prototype platforms 210, 220, and in emulator platform 250, thereby creating or forming a location database 360, 370 associated with the multitude of design objects. Location database 360, 370 maps the location of each of the multitude of design objects respectively in prototype platforms 210, 220, and in emulator platform 250. It is understood that compiling may include or enable programming logic structures in an FPGA chip.

Input 230 of prototype platforms 210, 220 is captured 430 with buffer 240 coupled to prototype platform 210, thereby creating or forming an input trace. Prototype platform 210 is run 440 (T1–T0) number of cycles behind prototype platform 220. Prototype platforms 210, 220 run the same circuit verification except at different time along timeline 110. A design state and memories of prototype platform 210 is frozen 450 or captured at time T0 when a trigger condition in the prototype platform 220 is met at time T1. For practical reasons the state of prototype platform 220 may be frozen at the same time as the trigger condition is met.

A multitude of values associated with the design state and memories of prototype platform 210 is transferred 460 from prototype platform 210 to emulation platform 250 according to location database 360, 370, which knows the location where each design object resides whether in prototype or emulation platform logic structure circuits. Transferring may include capturing the multitude of state values in an associated multitude of registers in prototype platform 210 using the "readback" feature of the prototype platform and loading the multitude of state values in an associated multitude of registers in Emulator platform 250 using the "writeback" feature of the emulator.

Emulator platform 250 is run 470 loaded with the design state at T0 with the input trace to replay the conditions leading up to the trigger condition at T1, the input trace having captured primary inputs between T0 and T1 to recreate the trigger or error condition. Emulator platform 250 provides the debugging resources to fix the error easier and quicker than running the verification in the prototype environment alone, while most of the verification before time T0 was run fastest in the prototype environment. Running may include reading the input trace out of buffer 240 and loading the input trace into emulator platform 250.

Figure 5:
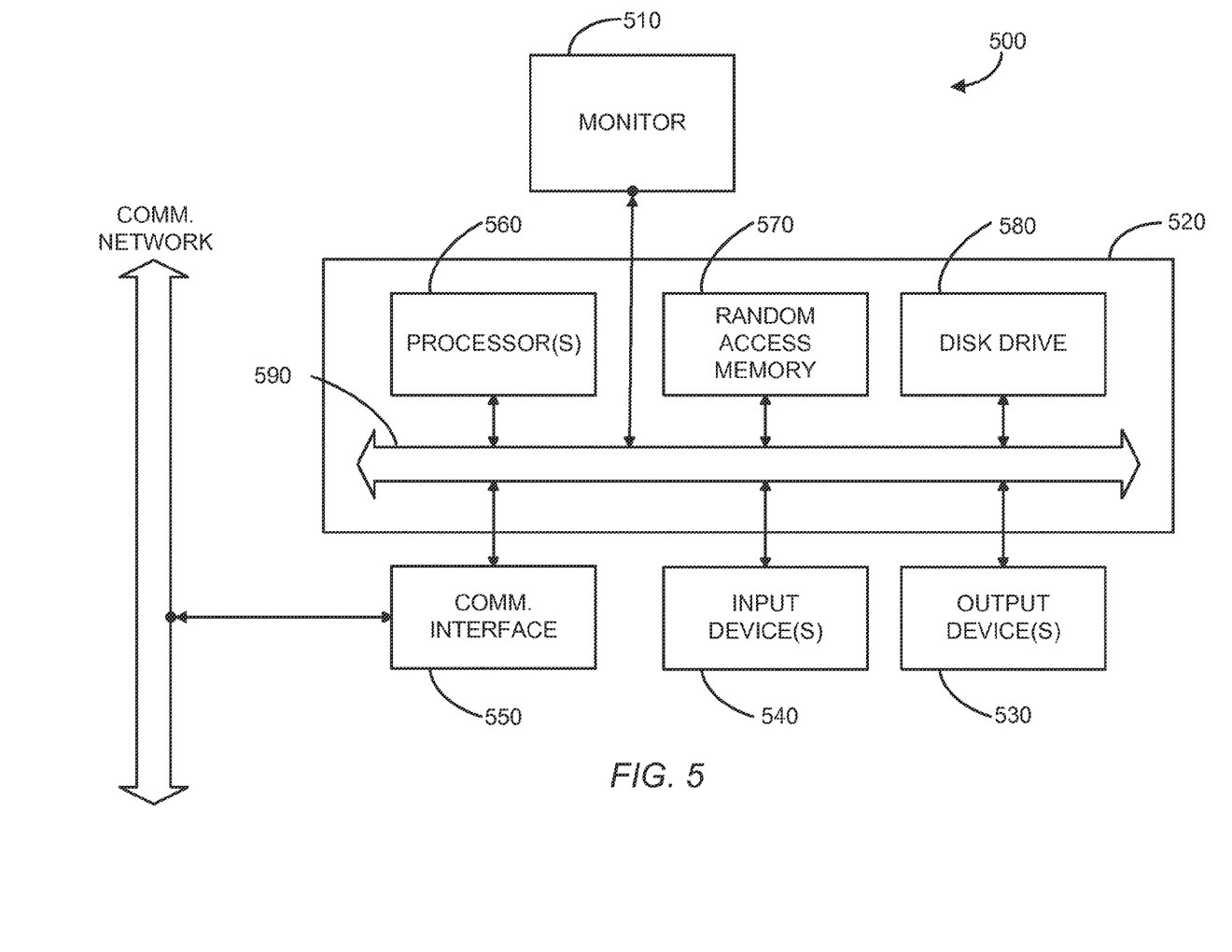
FIG. 5 is a block diagram of a computer system that may incorporate embodiments of the present invention.

FIG. 5 is a simplified block diagram of a computer system that may incorporate embodiments of the present invention. FIG. 5 is merely illustrative of an embodiment incorporating the present invention and does not limit the scope of the invention as recited in the claims. One of ordinary skill in the art would recognize other variations, modifications, and alternatives.

In one embodiment, computer system 500 typically includes a monitor 510, a computer 520, user output devices 530, user input devices 540, communications interface 550, and the like.

As shown in FIG. 5, computer 520 may include a processor(s) 560 that communicates with a number of peripheral devices via a bus subsystem 590. These peripheral devices may include user output devices 530, user input devices 540, communications interface 550, and a storage subsystem, such as random access memory (RAM) 570 and disk drive 580.

User input devices 530 include all possible types of devices and mechanisms for inputting information to computer system 520. These may include a keyboard, a keypad, a touch screen incorporated into the display, audio input devices such as voice recognition systems, microphones, and other types of input devices. In various embodiments, user input devices 530 are typically embodied as a computer mouse, a trackball, a track pad, a joystick, wireless remote, drawing tablet, voice command system, eye tracking system, and the like. User input devices 530 typically allow a user to select objects, icons, text and the like that appear on the monitor 510 via a command such as a click of a button or the like.

User output devices 540 include all possible types of devices and mechanisms for outputting information from computer 520. These may include a display (e.g., monitor 510), non-visual displays such as audio output devices, etc.

Communications interface 550 provides an interface to other communication networks and devices. Communications interface 550 may serve as an interface for receiving data from and transmitting data to other systems. Embodiments of communications interface 550 typically include an Ethernet card, a modem (telephone, satellite, cable, ISDN), (asynchronous) digital subscriber line (DSL) unit, FireWire interface, USB interface, and the like. For example, communications interface 550 may be coupled to a computer network, to a FireWire bus, or the like. In other embodiments, communications interfaces 550 may be physically integrated on the motherboard of computer 520, and may be a software program, such as soft DSL, or the like.

In various embodiments, computer system 500 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 520 includes one or more Xeon microprocessors from Intel as processor(s) 560. Further, one embodiment, computer 520 includes a UNIX-based operating system.

RAM 570 and disk drive 580 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 570 and disk drive 580 may be configured to store the basic programming and data constructs that provide the functionality of the present invention.

Software code modules and instructions that provide the functionality of the present invention may be stored in RAM 570 and disk drive 580. These software modules may be executed by processor(s) 560. RAM 570 and disk drive 580 may also provide a repository for storing data used in accordance with the present invention.

RAM 570 and disk drive 580 may include a number of memories including a main random access memory (RAM) for storage of instructions and data during program execution and a read only memory (ROM) in which fixed instructions are stored. RAM 570 and disk drive 580 may include a file storage subsystem providing persistent (non-volatile) storage for program and data files. RAM 570 and disk drive 580 may also include removable storage systems, such as removable flash memory.

Bus subsystem 590 provides a mechanism for letting the various components and subsystems of computer 520 communicate with each other as intended. Although bus subsystem 590 is shown schematically as a single bus, alternative embodiments of the bus subsystem may utilize multiple busses.

FIG. 5 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable storage medium as a set of instructions configured to direct a processor of a computer system to perform a set of steps disclosed in embodiments of the present invention. The logic may form part of a computer program product configured to direct an information-processing device to perform a set of steps disclosed in embodiments of the present invention. Based on the disclosure and teachings provided herein, a person of ordinary skill in the art will appreciate other ways and/or methods to implement the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims. In addition, the technique and system of the present invention is suitable for use with a wide variety of EDA tools and methodologies for designing, testing, and/or manufacturing integrated circuits or other electronic devices. The scope of the invention should, therefore, be determined not with reference to the above description, but instead should be determined with reference to the pending claims along with their full scope or equivalents.

What is claimed is:

1. A method for verifying a circuit design, the method comprising:
   providing first and second prototypes of the circuit;
   applying a plurality of input signals to the second prototype of the circuit at a first point in time;
   configuring the second prototype of the circuit to detect a condition;
   applying the plurality of input signals to the first prototype of the circuit at a second point in time occurring after the first point in time by a predetermined number of cycles of a clock;
   capturing a design state of the first prototype when the condition is met;
   capturing at least a first subset of the plurality of input signals during a period defined by the first and second points in time;
   configuring a hardware emulator to represent the circuit design;
   loading the captured design state to the hardware emulator; and
   applying the captured at least first subset of the plurality of input signals to the hardware emulator to verify the circuit design.

2. The method of claim 1 further comprising compiling a representation of the circuit design to form the first prototype and the second prototype.

3. The method of claim 2, wherein compiling includes programming a plurality of logic blocks in one or more field programmable gate array (FPGA) chip.

4. The method of claim 2, wherein compiling further includes compiling a register transfer logic (RTL) inference representing the circuit design into a plurality of design objects thereby forming a location database associated with the plurality of design objects, the design objects being implemented respectively in the first prototype, the second prototype, and the hardware emulator.

5. The method of claim 4, wherein the location database maps the location of each of the plurality of design objects respectively in the first prototype, the second prototype, and the hardware emulator.

6. The method of claim 1 further comprising:
capturing a value stored in each of a plurality of registers disposed in the first prototype; and
loading each captured value in a different one of a plurality of registers disposed in the hardware emulator.

7. The method of claim 1 further comprising:
freezing a state of the first prototype when the condition in the second prototype is met.

8. The method of claim 1 further comprising:
freezing a state of the second prototype when the condition in the second prototype is met.

9. The method of claim 1, wherein the first prototype and the second prototype are substantially identical to one another.

\* \* \* \* \*